United States Patent [19]

Wilson et al.

[11] 4,379,687

[45] Apr. 12, 1983

[54] MOLD APPARATUS

[76] Inventors: Robert E. Wilson, 6116 W. Karen Lee La., Glendale, Ariz. 85306; Dan Mickelson, 2930 W. Orangewood, Phoenix, Ariz. 85017

[21] Appl. No.: 241,249

[22] Filed: Mar. 6, 1981

Related U.S. Application Data

[63] Continuation of Ser. No. 160,820, Jun. 18, 1980, abandoned.

[51] Int. Cl.³ ............................................. B29C 17/03
[52] U.S. Cl. .................................... 425/388; 425/186; 249/103
[58] Field of Search ................ 425/186, 388; 249/102, 249/103, 104

[56] References Cited

U.S. PATENT DOCUMENTS

| | | | |
|---|---|---|---|
| 1,533,830 | 4/1925 | Cochran | 249/103 |
| 1,931,358 | 10/1933 | Richards | 249/103 |
| 2,330,277 | 9/1943 | Fritschle | 249/103 X |
| 3,317,960 | 5/1967 | Kramer | 425/388 X |
| 3,354,509 | 11/1967 | Ammondson | 249/103 X |
| 3,378,888 | 4/1968 | Robertson | 425/388 X |
| 3,496,607 | 2/1970 | Larson | 425/388 X |
| 3,986,804 | 10/1976 | Haag | 425/388 |
| 4,099,901 | 7/1978 | Shuman | 425/388 |

Primary Examiner—Thomas P. Pavelko
Attorney, Agent, or Firm—Woodling, Krost & Rust

[57] ABSTRACT

A vacuum forming mold for reshaping sheets of thermoplastic material is provided with means to impart indicia to the articles produced. Such indicia can be molded into the article by providing interchangeable members which are insertable and removeable from the mold. By arranging the members in different combinations any desired numbering can be obtained.

8 Claims, 8 Drawing Figures

MOLD APPARATUS

This is a continuation, of application Ser. No. 160,820 filed June 18, 1980, now abandoned.

The present invention relates to the art of vacuum forming or thermo forming. In this particular art, articles of manufacture are made by heating a sheet of thermoplastic material and causing the heated sheet of material to conform closely around a mold shape. It is usual to produce a vacuum between the surface to which the sheet is to be conformed and the sheet itself. This is accomplished for example by drawing air through holes in the surface upon which the mold shape is mounted. In many instances a positive pressure assist is utilized and is applied to the outer surface of the heated sheet of thermoplastic material to help conform it about the mold shape.

It is often desirable to be able to identify by a coded number identification articles of manufacture that are produced by the method described above. Included in such articles of manufacture are many containers that contain chemical mixtures, for example, cosmetics which may be subject to recall because of difficulties that can arise because of the different chemicals used in the mixtures. These containers may be located at many places in the stream of commerce when such a recall might take place and a permanent means of identification of a given batch of the chemical composition is practically a "must". Other reasons for the necessity of being able to identify a given article of manufacture are almost limitless.

At the present time one of the most common means of identifying articles of manufacture as having been produced from a given batch of a chemical composition, is to simply apply an adhesive label containing the desired information to the article of manufacture. This method of identification while satisfactory in many instances is undesirable because of the ease of obliteration of the label or under some circumstances the actual physical disengagement of the label from the article of manufacture.

The present invention addresses itself to the art referred to above and to many of the problems that have been discussed.

The present invention discloses an apparatus for permanently identifying articles of manufacture produced in the manner described above.

An object of the present invention is to provide a mold apparatus for permanently marking articles of manufacture and which includes a plurality of slidable bar members which are insertable into and removable from the mold apparatus and which carry numbering indicia thereon which numbering indicia can be changed by simply utilizing different combinations of the slidable bar numbers.

Another object of the present invention is to provide a mold apparatus for permanently marking vacuum formed products with identifying indicia and which includes a mold plate having raised mold configurations thereon and a base plate upon which the mold plate rests. The base plate has a plurality of slots in the surface thereon which slots are adapted to accommodate a plurality of slidable bar members which bar members carry die portions having numbers thereon which die portions are adapted to reside in openings in the mold plate and specifically within the mold configurations carried thereon so that the vacuum formed material is impressed with the identifying indicia carried on the die portions.

Other objects and a fuller understanding of this invention may be had by referring to the following description and claims, taken in conjunction with the accompanying drawings, in which:

Figure 1:
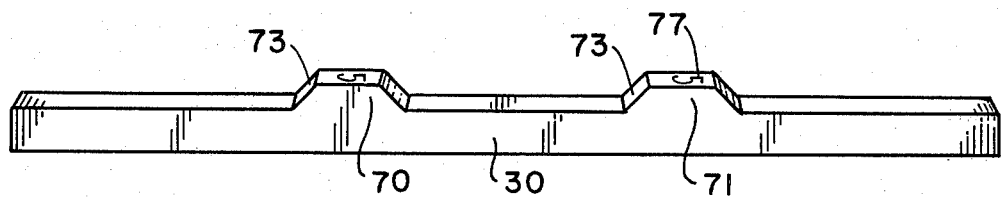
FIG. 1 is perspective view of one of the bars which is usable in the mold apparatus of the present invention which bar carries first and second die portions each of which has a number indicia carried on the top surface thereof.

The mold apparatus of the present invention has been indicated generally by the reference numeral 20 and the apparatus includes in combination a base plate 23, a mold plate 26, and a plurality of indicia carrying bars 30.

Figure 2:
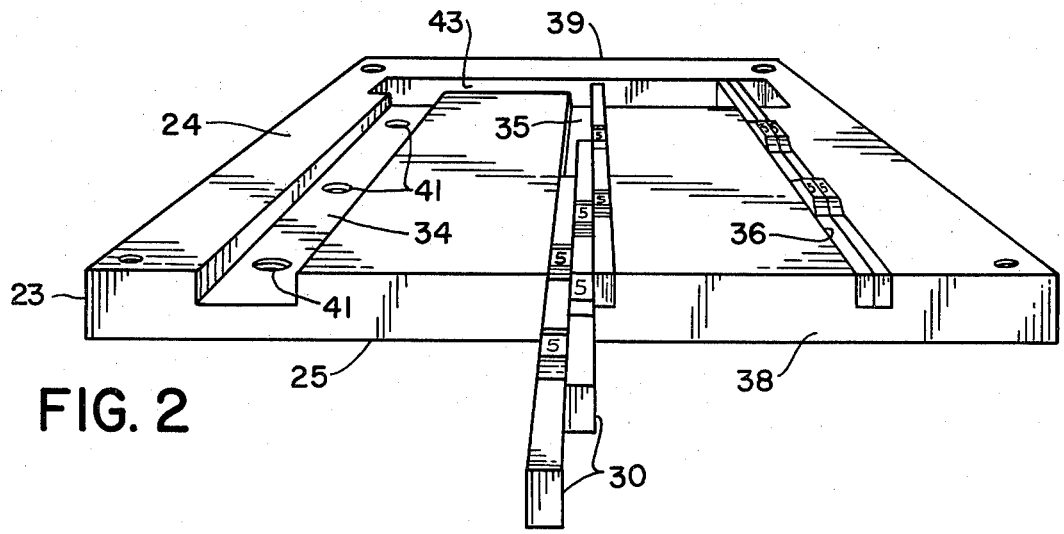
FIG. 2 is a perspective view of a base plate of the mold apparatus of the present invention illustrating the cooperation between the bars shown in FIG. 1 and the slots illustrated in the base plate.
Figure 3:
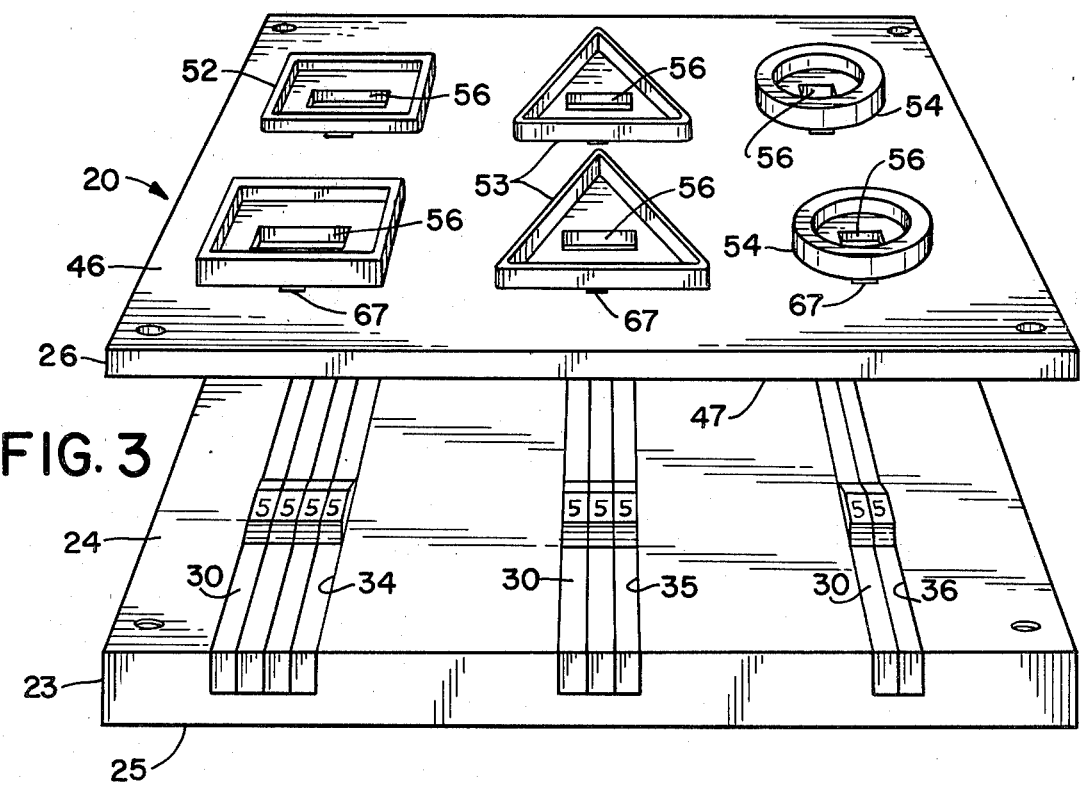
FIG. 3 is an exploded perspective view of the mold apparatus of the present invention which includes the base plate and the bars illustrated in FIGS. 1 and 2 in combination with a mold plate.
Figure 6:
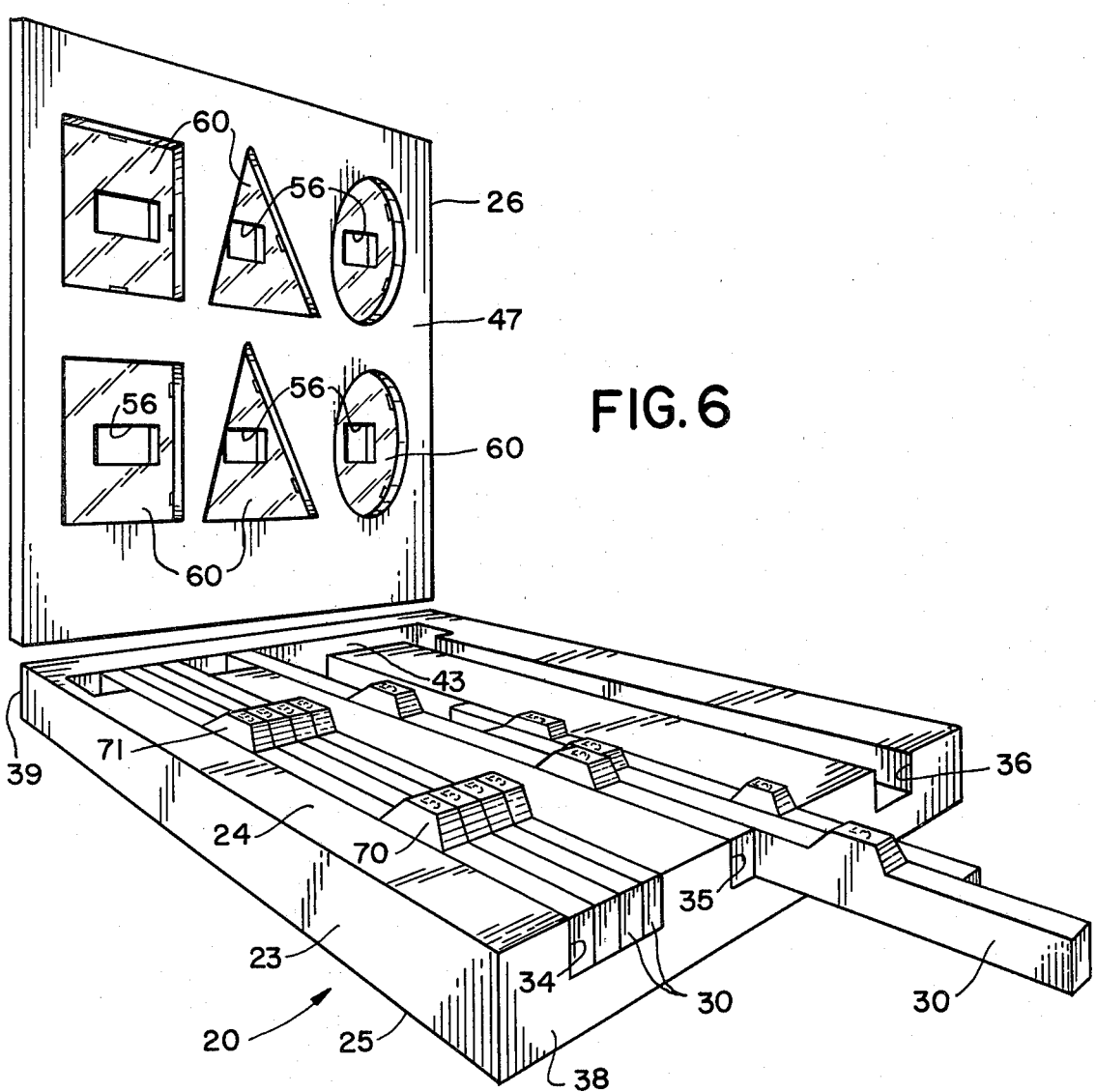
FIG. 6 is an exploded perspective view of the mold apparatus of the present invention showing the mold plate moved through 90° from the position illustrated in FIGS. 4 and 5 so that the underside of the mold plate can be readily seen.
Figure 7:
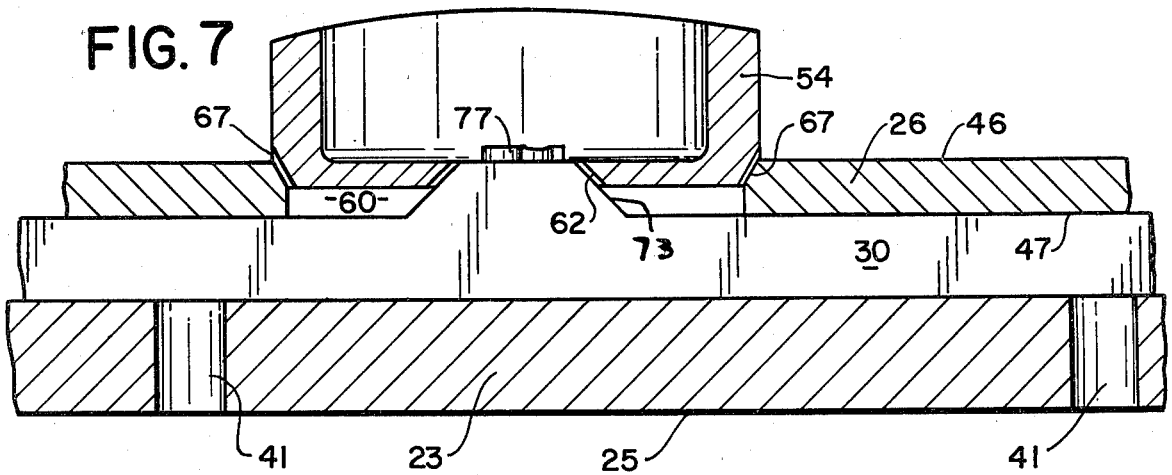
FIG. 7 is an enlarged fragmentary view taken generally along the line 7—7 of FIG. 4 and illustrating how the die portions on the bars fit within die receiving openings in the mold plate.

The base plate 23 as seen is flat and is generally rectangular in shape having first and second spaced and generally parallel surfaces 24 and 25 respectively. The base plate 23 is provided with a plurality of spaced and generally parallel slots 34, 35 and 36 provided in the upper surface thereof. The slots 34–36 are generally rectangular in cross-section and each of the slots extends from a front surface 38 of the base plate and each terminates short of a rear surface 39 of the base plate. This is well illustrated in the drawings, particularly in FIGS. 2 and 6. Each of the slots 34–36 is provided with three air ducts all of which are identified by the reference numeral 41. These air ducts extend from the bottom of each of the slots to the second surface 25 of the base plate 23. An abutment surface 43 is formed in the base plate and is located adjacent the ends of the slots 34–36 where these slots terminate short of the rear surface of the base plate.

The mold plate 26 is flat and is rectangularly shaped and has first and second spaced and generally parallel surfaces 46 and 47 respectively. The second surface 47 of the mold plate engages the first surface 24 of the base plate in the operative condition of the mold apparatus as seen for example in FIGS. 4, 5, 7 and 8. Threaded members 50 are utilized to removably connect the base plate and mold plates together. These threaded members 50 are provided in the four corners of the plates.

The first surface 46 of the mold plate is provided with a plurality of raised mold configurations about which thermoplastic sheet materials are adapted to be molded. In this description three different mold configurations have been shown simply for the sake of illustrating the invention. Generally square configurations are identified by the reference numeral 52; a triangular configuration has been identified by the reference numeral 53 and a circular configuration has been illustrated by the reference numeral 54. It should be understood by those skilled in the art that normally the mold configurations for a given mold apparatus would all be the same. The illustration herein of configurations 52, 53 and 54 has been made to illustrate that the gist of the invention can be utilized with any type of configuration. These specific configurations which have been illustrated herein are for the purpose of constructing the bottom portion of a container that is adapted to be filled with a wax base type makeup composition so as to carry it to its ultimate consumers. The lid portion of the container is manufactured in a similar fashion with a mold apparatus which may or may not contain the identification means of the present application.

The mold plate 26 is provided with a die receiving opening 56 in or within the confines of each mold configuration 52-54 as best seen in FIGS. 3, 6, 7 and 8 and these die receiving openings extend through from the first surface 46 of the mold plate 26 to the second surface 47. The second surface or underside of the mold plate in the area of the mold configurations is provided with an undercut or recessed surface 60 for a reason to be described more fully hereinafter. Each of the die receiving openings 56 is also constructed such that it has a tapered wall 62 (FIGS. 7 and 8) which is aligned with one of the slots 34-36 with which it is associated. One of the dimensions of each of the die receiving openings 56 is designed to be substantially equal to the width of a slot with which it is aligned. In this respect and viewing FIG. 3, for example the die receiving openings associated with mold configurations 52 have a dimension from left to right as viewed in FIG. 3 which is the same dimension as the width of slot 34. The width of die receiving opening 56 in configuration 53 is the same as the width of slot 35 and the same is true with respect to mold configurations 54 and associated slot 36.

Air vent openings are provided within the mold plate each of which has been identified by the reference numeral 67. It will be noted that a plurality of these openings have been provided and they extend from the first surface 46 of the mold plate in close proximity to the mold configurations and they extend into the recessed surfaces 60 on the underside of the mold plate. These air vent openings are not absolutely necessary for total functioning of the invention disclosed herein; however, they are desirable in many circumstances to evacuate air and thereby assist the heated plastic sheet to closely conform to the upper surface of the mold plate during the vacuum forming operation.

A plurality of indicia carrying bars 30 are provided in slot 34 in the upper surface of the base plate 23 and the same type of bars are provided in slots 35 and 36. The slots as they cooperate with the bars which carry dies may at times be referred to as die locating surface means on the first surface of the base member or plate 23.

It will be noted there are four bars shown in slot 34, three in slot 35 and only two in slot 36. This has been done simply to illustrate the flexibility in any numbering system that might be desired by one utilizing the teachings of the present invention.

The bars 30 as they reside in their respective slots 34-36 extend generally longitudinally parallel to each other and in side by side relationship to each other. The bars are capable of sliding relative to each other when the base plate and the mold plate are separated as is their condition illustrated in FIGS. 3 and 6. In completely assembled condition the first end portions of bars 65 are flush with the front surface 38 of the base plate and second end portions of the bars are in engagement with the abutment surface 43. By means of this construction the bars can be very accurately located with respect to the base plate. Each of the bars is provided with first and second longitudinally spaced die portions 70 and 71 respectively each of which has a tapered wall portion 73. In assembled condition the first die portions of the bars 65 which reside in a given slot are located adjacent each other and they reside in a given die receiving opening 56. The tapered wall portion of the die portions engage or reside adjacent the tapered wall 62 which is part of the die receiving opening 56. The tolerance between the tapered wall 62 and the tapered wall portion 73 is such that a small gap or space exists which is sufficient to transmit air, for example from within a mold configuration on the top surface of the mold plate into the slots 34-36 which accommodate the bars 65. The second die portions 71 on each of the bars 30 reside in another die receiving opening as illustrated in the drawings and the tapered wall portion thereof is accommodated as just described.

Indicia means 77 are carried on the uppermost surface of the first and second die portions 70 and 71 and as illustrated in the drawings the number "5" is shown as the indicia means in all instances. The indicia means 77 are positioned approximately in the center of each of the mold configurations 52-54.

Figure 8:
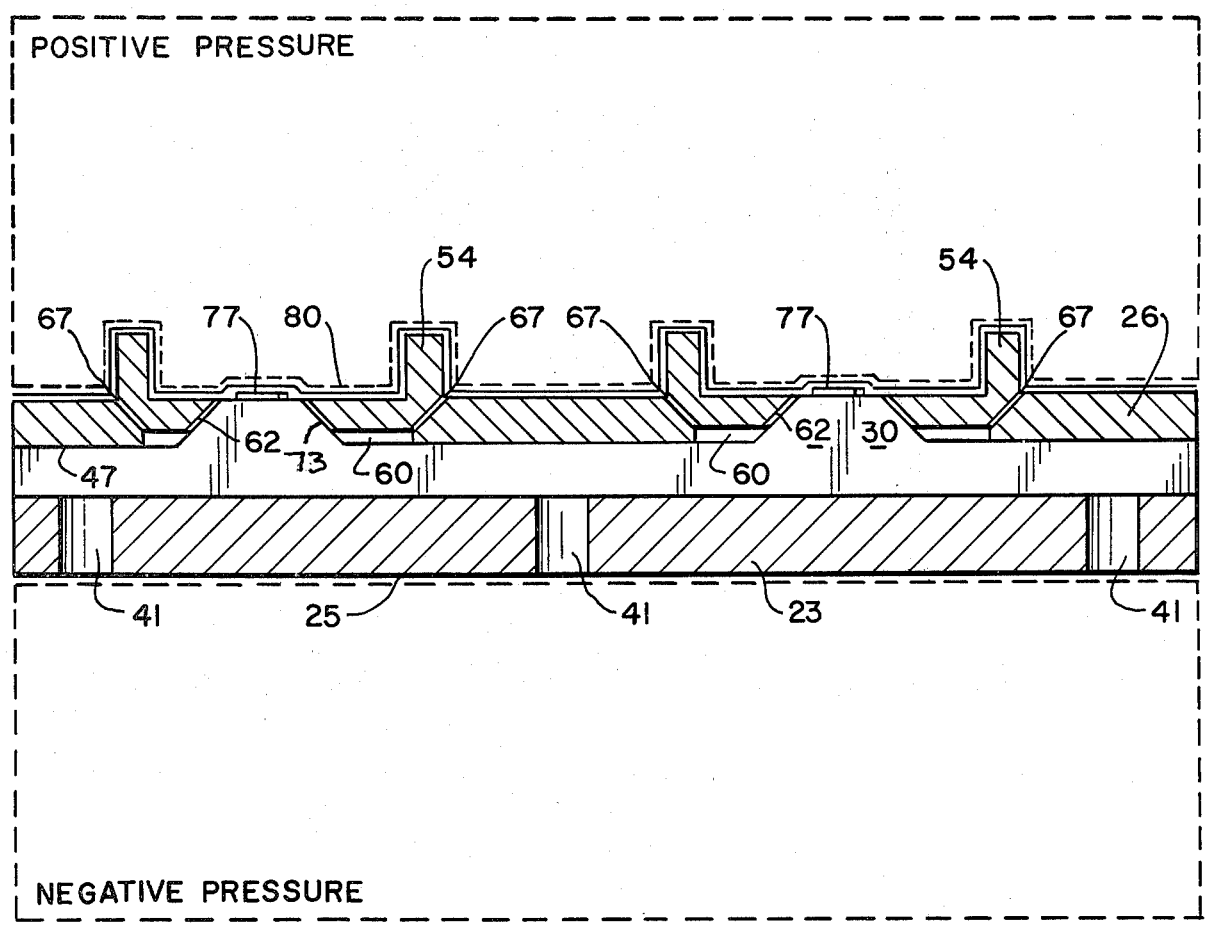
FIG. 8 is a view taken in the same direction as FIG. 7 but being on a slightly smaller scale thereby illustrating more of the mold apparatus.

FIG. 8 is a schematic representation of the positioning of the mold apparatus 20 in a vacuum forming apparatus and illustrates the conforming of a heated thermoplastic sheet as a result of a vacuum forming apparatus. The mold apparatus is mounted in a vacuum forming apparatus which in this particular instance includes a negative pressure source as illustrated schematically which serves to evacuate air from beneath the plastic sheet causing the plastic sheet illustrated by the reference numeral 80 to conform closely to the contour of the mold configurations 52-54 as illustrated. Air is evacuated from beneath the thermoplastic sheet 80 by means of the air vent openings 67 and by means of the small gap or passage which is formed between the tapered wall 62 and tapered wall portion 73. In the particular schematic embodiment which is shown in FIG. 8 there has been illustrated an area of positive pressure so as to give a positive pressure assist to aid in closely conforming the plastic sheet 80 about the mold configurations. Air which passes into area of slots 34-36 passes between the bars 65 to the bottom of the respective slots, through the air ducts 41 which are located in the bottom of the slots and thereafter is exhausted to the source of the negative pressure.

It will be appreciated by those skilled in the art that the mold apparatus of the present invention may be mounted in a vacuum forming apparatus in the position shown in FIG. 8 or it may be mounted in an exactly opposite position wherein the so-called base plate 23 is on the top and the mold plate 26 and attached mold configurations are on the bottom. In either event the apparatus functions essentially in the same fashion.

It is believed that with the above discussion of the details of the construction and operation that the advantages and versatility of the mold apparatus of the present invention will be appreciated. A brief additional explanation will be given to illustrate the total use of the invention disclosed herein.

Taking for example the mold configurations 52 for this discussion, it will be seen that a four digit numbering system is possible. For example, various batch numbers may be identified from "1" to "9,999". In the specific example that has been shown in FIG. 3 (slot 34) the batch number or other identification is 5,555 and if one desires to change the numbering system to one digit higher all that one needs to do is replace the fourth bar from the left in slot 34 as viewed in FIG. 3 with another bar which carries the number "6" as the indicia means 77. It will be obvious that the numbering system possible in slot 35 encompasses numbers from "1" to "999" and in slot 36 numbers from "1" to "99".

Figure 4:
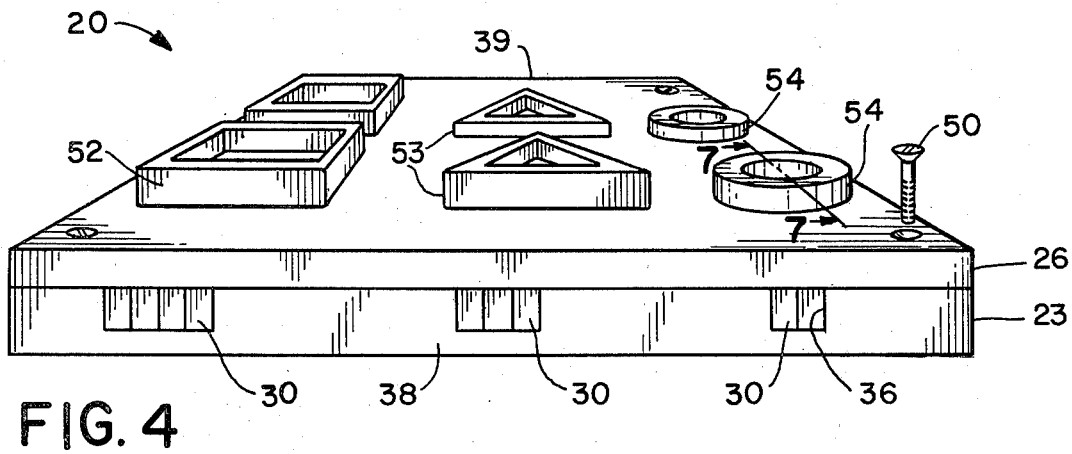
FIG. 4 is a perspective view of the mold apparatus as illustrated in FIG. 3, however, showing all of the components in assembled condition.
Figure 5:
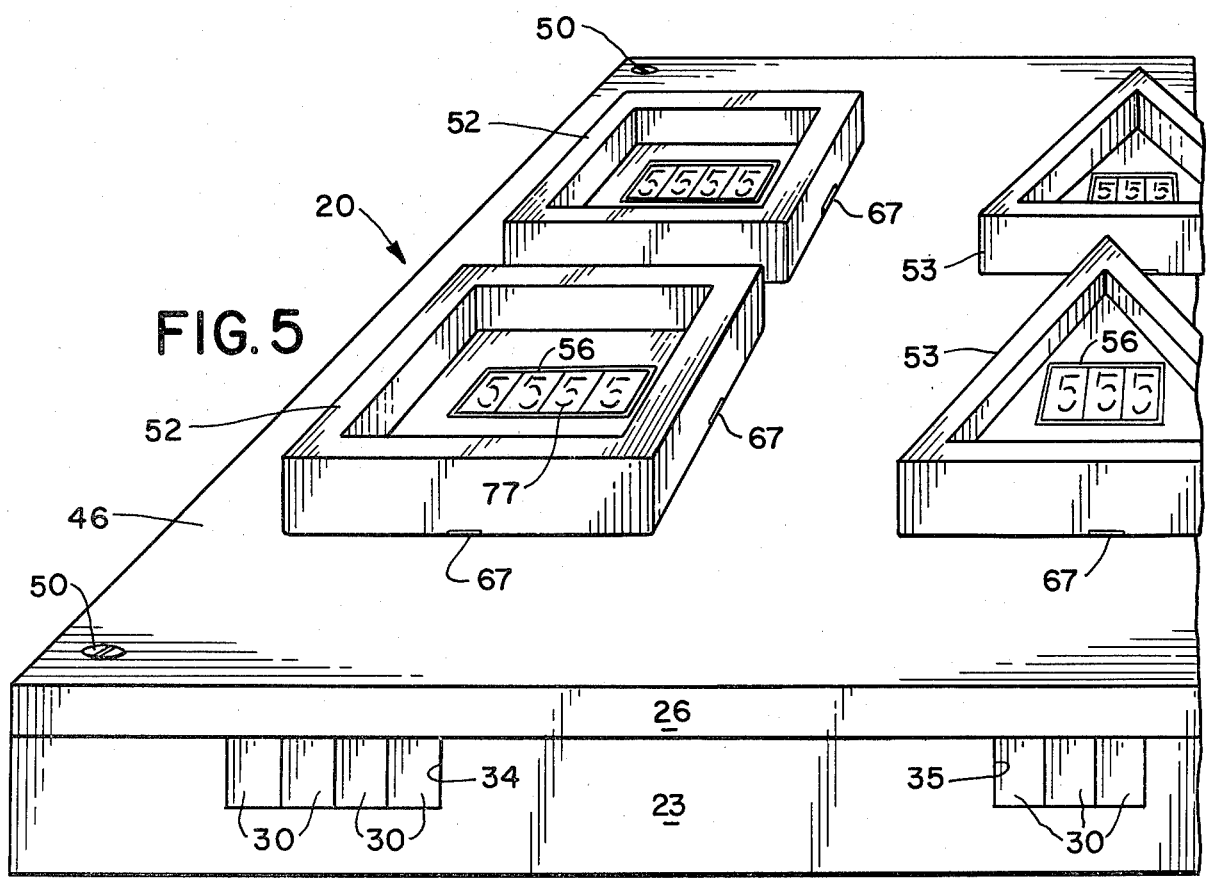
FIG. 5 is an enlarged fragmentary view of a portion of the mold apparatus illustrated in FIG. 4.

It will therefore be seen that the mold apparatus as hereinabove described accomplishes the general objects that have been set forth and with an extremely reliable construction. The number of parts has been maintained at a minimum and the construction is such that it is not susceptible to damage and malfunctioning because of the interrelationship between the parts which have been identified. It will be appreciated from having been pointed out hereinabove that with the base plate, mold plate and bars locked firmly in position by the threaded members 50 as shown in FIGS. 4 and 5 that the parts are firmly fixed relative to each other. When the identifying indicia are desired to be changed and it is necessary to replace one of the bars 30 with another bar carrying different indicia that the base plate and mold plate must be separated, for example to the position of FIG. 3 so that this change can be effected. After the change has been effected the parts are returned to the condition shown in FIG. 4.

Although this invention has been described in its preferred form with a certain degree of particularity, it is understood that the present disclosure of the preferred form has been made by way of example and that numerous changes in the details of construction and the combination and arrangement of parts may be resorted to without departing from the spirit and the scope of the invention as hereinafter claimed.

What is claimed is:

1. A mold apparatus including in combination, a flat, generally rectangularly shaped base plate having first and second spaced and generally parallel surfaces, said base plate having a plurality of spaced and generally parallel slots of rectangular cross-section in said first surface thereof, each said slot extending longitudinally from a first edge of said base plate and terminating short of a second edge of said base plate opposite said first edge, said base plate having at least one air duct extending between said second spaced surface thereof and each said slot, an abutment surface formed in said base plate and located adjacent said slots where said slots terminate short of said second edge of said base plate, a flat, generally rectangularly shaped mold plate having first and second spaced and generally parallel surfaces, said second surface of said mold plate engaging said first surface of said base plate, means removably connecting said mold plate to said base plate, said first surface of said mold plate having a plurality of raised mold configurations about which thermoplastic sheets are adapted to be molded, said mold plate having a die receiving opening in each said mold configuration extending therethrough to said second surface of said mold plate, each said die receiving opening having a tapered wall portion and being aligned with one of said parallel slots in said base plate, one of the dimensions of each said die receiving opening being substantially equal to the width of a slot with which it is aligned, a multiplicity of air vent openings extending through said mold plate from said first to said second surfaces thereof, said air vent openings being located in close proximity to said mold configurations and communicating with said slots, a plurality of bars each having first and second end portions and located in each of said slots, each said bar being generally rectangular in cross-section, said bars in each slot extending longitudinally parallel to each other in side by side relationship and being slidable relative to each other when said base plate and mold plate are separated from each other, said first end portions of said bars being flush with said first edge of said base plate and said second end portions of said bars being in engagement with said abutment surface, each of said bars having first and second longitudinally spaced die portions each of which has a tapered wall portion, said first die portions of said bars which reside in a given slot being located adjacent each other and residing in a given die receiving opening with said tapered wall portions thereof engaging said tapered wall portion of said given die receiving opening, said second die portions of said bars which reside in said given slot being located adjacent each other and residing in another given die receiving opening with said tapered wall portions thereof engaging said tapered wall portions of said another given die receiving opening, indicia means carried on top portions of each of said first and second die portions and located within a mold configuration to reproduce said indicia means on an article molded about the mold configuration; said mold apparatus adapted to be attached to a vacuum molding apparatus with said air ducts in said base plate in fluid communications with a vacuum source in said vacuum molding apparatus.

2. A mold apparatus including in combination, a base plate having first and second spaced surfaces, said base plate having a plurality of spaced and generally parallel slots in said first surface thereof, each said slot extending longitudinally from a first edge of said base plate and terminating short of a second edge of said base plate opposite said first edge, said base plate having at least one air duct extending between said second spaced surface thereof and each said slot, an abutment surface formed in said base plate and located adjacent said slots where said slots terminate short of said second edge of said base plate, mold plate having first and second spaced surfaces, said second surface of said mold plate engaging said first surface of said base plate, means removably connecting said mold plate to said base plate, said first surface of said mold plate having a plurality of raised mold configurations about which thermoplastic sheet material is adapted to be molded, said mold plate having a die receiving opening in each said mold configuration extending therethrough to said second surface of said mold plate, each said die receiving opening being aligned with one of said parallel slots in said base plate, a multiplicity of air vent openings extending from said first to said second surfaces of said mold plate, said air vent openings being located in close proximity to said mold configurations and communicating with said slots, a plurality of bars each having first and second end portions and located in each of said slots, said bars in each slot extending longitudinally parallel to each other in side by side relationship and being slidable relative to each other when said base plate and mold plate are separated from each other, said first end portions of said bars being flush with said first edge of said base plate and said second end portions of said bars being in engagement with said abutment surface, each of said bars having first and second longitudinally spaced die portions, said first die portions of said bars which reside in a given slot being located adjacent each other and residing in a given die receiving opening, said second die portions of said bars which reside in said given slot being located adjacent each other and residing in another given die receiving opening, and indicia means carried on top portions of each of said first and second die portions and located within a mold configuration to reproduce said indicia means on an article molded about the mold configuration.

3. A mold apparatus including in combination, a base plate having first and second spaced surfaces, said base plate having at least one slot in said first surface thereof, said base plate having at least one air duct extending between said second spaced surface thereof and said slot, a mold plate having first and second spaced surfaces, said second surface of said mold plate engaging said first surface of said base plate, means removably connecting said mold plate to said base plate, said first surface of said mold plate having at least one mold configuration about which material is adapted to be molded, said mold plate having a die receiving opening in said mold configuration extending therethrough to said second surface of said mold plate, said die receiving opening being aligned with said slot in said base plate, a bar member located in said slot, said bar having a die portion, said die portion of said bar residing in said die receiving opening, indicia means carried on said die portion and located within said mold configuration to reproduce said indicia means on the material which is adapted to be molded about the mold configuration.

4. A mold apparatus including in combination, a base member having first and second spaced surfaces, said base member having at least one air duct extending between said first and second spaced surface thereof, a mold member having first and second spaced surfaces, said second surface of said mold member being located adjacent said first surface of said base member, said first surface of said mold member having at least one mold configuration about which material is adapted to be molded, said mold member having a die receiving opening in said mold configuration extending therethrough to said second surface of said mold member, a die member residing in said die receiving opening, indicia means carried on said die member and located within said mold configuration to reproduce said indicia means on the material which is adapted to be molded about the mold configuration, and air evacuation openings extending between said first and second surfaces of said mold member and being in fluid communication with said at least one air duct to evacuate air from said mold configuration.

5. A mold apparatus as claimed in claim 4 wherein die locating surface means are provided on said first surface of said base member to receive said die member to assist in holding said die member in position.

6. A mold apparatus as claimed in claim 5 wherein said die locating surface means comprises a slot in said first surface of said base member and a bar member resides in said slot and said die member is carried by said bar member.

7. A mold apparatus as claimed in claim 6 wherein said slot and said bar member are generally rectangular in cross sectional configuration.

8. A mold apparatus as claimed in claim 7 wherein a plurality of mold configurations are provided on said first surface of said mold member, a plurality of bar members are provided in said slot and a plurality of die members are carried on at least one bar member.

* * * * *